United States Patent [19]

Hosoi et al.

[11] Patent Number: 4,951,241
[45] Date of Patent: Aug. 21, 1990

[54] PORTABLE APPARATUS HAVING AN ADJUSTABLE HANDLE-LEG MEMBER

[75] Inventors: Takashi Hosoi; Katumaru Sasaki, both of Oume, Japan

[73] Assignee: Kabushiki Kaisha Toshiba, Kanagawa, Japan

[21] Appl. No.: 408,408

[22] Filed: Sep. 18, 1989

Related U.S. Application Data

[63] Continuation of Ser. No. 66,543, Jun. 26, 1987, abandoned.

[30] Foreign Application Priority Data

Jun. 30, 1986 [JP] Japan .............................. 61-98839[U]

[51] Int. Cl.⁵ ................................................ G06F 1/00
[52] U.S. Cl. ...................................................... 364/708
[58] Field of Search ......................... 364/708; 294/168

[56] References Cited

U.S. PATENT DOCUMENTS

| | | | |
|---|---|---|---|
| 2,427,004 | 9/1947 | Kampf | 294/168 |
| 4,571,456 | 2/1986 | Paulsen et al. | 179/2 C |
| 4,617,640 | 10/1986 | Kishi et al. | 364/708 |
| 4,661,921 | 4/1987 | Barnes | 364/708 |
| 4,669,053 | 5/1987 | Krenz | 364/708 |
| 4,742,478 | 5/1988 | Nigro, Jr. et al. | 364/708 |

FOREIGN PATENT DOCUMENTS 353453 10/1972 Japan .

OTHER PUBLICATIONS

"Keyboard Support Lifting Assembly with Locking Feature", *IBM Tech. Disclosure Bulletin*, vol. 28, No. 6, Nov. 85, pp. 2361-2363.

*Primary Examiner*—David H. Malzahn
*Attorney, Agent, or Firm*—Finnegan, Henderson, Farabow, Garrett, and Dunner

[57] ABSTRACT

A portable apparatus comprises a handle-leg for supporting a body of the portable apparatus, a guide device for slidably and pivotably guiding the handle-leg with respect to the body of the portable apparatus, a first locking device for locking the handle-leg in a stored position in which the handle-leg is stored in the body of the portable apparatus when the handle-leg is slid, and a second locking device for locking the handle-leg in a supporting position in which the handle-leg supports the body of the portable apparatus after the handle-leg is pivoted.

13 Claims, 5 Drawing Sheets

PORTABLE APPARATUS HAVING AN ADJUSTABLE HANDLE-LEG MEMBER

This application is a continuation of application Ser. No. 066,543 filed June 26, 1987, now abandoned.

BACKGROUND OF THE INVENTION

1. Field of the Invention

The present invention relates to a portable electronic apparatus such as a portable personal computer and a portable word processor, and particularly to the structure of a handle acting as a leg portion of the apparatus as well.

2. Description of the Prior Art

A portable electronic apparatus such as a portable personal computer and a portable word processor is required to have a carrying handle as well as a folded leg portion to facilitate their keyboard operations in using the portable electronic apparatus.

FIG. 1 is a view showing a bottom shape of a portable electronic apparatus according to the prior art. In the figure, a case 1 constituting the apparatus body has a folded handle 2 fitted to a front portion of the bottom of the case 1, and a leg portion 3 pivotably fitted to a rear portion of the bottom of the case 1. In order to store the folded handle 2 and the leg portion 3, recesses 4 and 5 having shapes corresponding to those of the folded handle 2 and the leg portion 3 are respectively formed on the bottom surface of the case 1.

The above arrangement has the following drawbacks.

(1) To use the apparatus after carrying it, the handle is stored in the recesses, and the leg portion is pulled out and locked. Further, to carry the apparatus after the use thereof, operations opposite to the above-mentioned operations are necessary, thereby bothering an operator.

(2) Two mechanisms, one mechanism for folding, unfolding, and locking the handle, and another mechanism for folding, unfolding, and locking the leg portion are required, increasing the cost.

(3) Since the handle and the leg portion are both received in the recesses formed on the bottom of the case, the thickness of the case must be designed by taking the depths of the recesses into account so that the case is bulky in contrast to its internal mechanism, lowering its commercial attraction.

SUMMARY OF THE INVENTION

To solve the above problems, an object of the present invention is to provide a portable casing apparatus with a handle which can act as a leg portion as well to increase the operability of the apparatus and to simplify the mechanism of the apparatus, and the thickness of the apparatus is reduced by storing the handle and leg portion on the rear side of the apparatus.

In order to accomplish the objects mentioned above, the present invention resides in a portable apparatus comprising a handle-leg means for supporting a body of said portable apparatus, guide means for slidably and pivotably guiding said handle-leg means with respect to said body of the portable apparatus, first locking means for locking said handle-leg means in a stored position in which said handle-leg means is stored in said body of the portable apparatus when said handle-leg means is slid, and second locking means for locking said handle-leg means in a supporting position in which said handle-leg means supports said body of the portable apparatus after said handle-leg means is pivoted.

BRIEF DESCRIPTION OF THE DRAWINGS

The other objects, features and advantages of the present invention will become more apparent from the following descriptions of the preferred embodiments thereof taken in conjunction with the accompanying drawings in which.

DETAILED DESCRIPTION OF THE PREFERRED EMBODIMENTS

The embodiments of the present invention will now be described with reference to the accompanying drawings.

FIGS. 2, 5, 6, and 7 are perspective views sequentially showing a handle-leg portion from a stored state to a used state in a portable apparatus according to the present invention.

In the Figures, a body case 100 has a keyboard (not shown) on its front top surface. A body cover 200 has an upper case connecting part 201. An upper case 300 has a plasma display pivotably hinged to the upper case connecting part 201.

Figure 1:
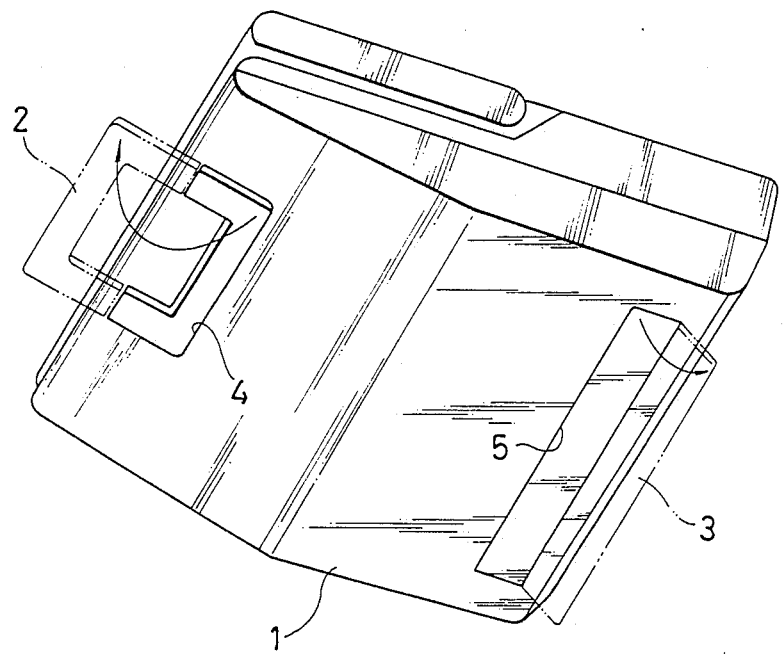
FIG. 1 is a perspective view showing the shape of the bottom of a conventional portable electronic apparatus.
Figure 2:
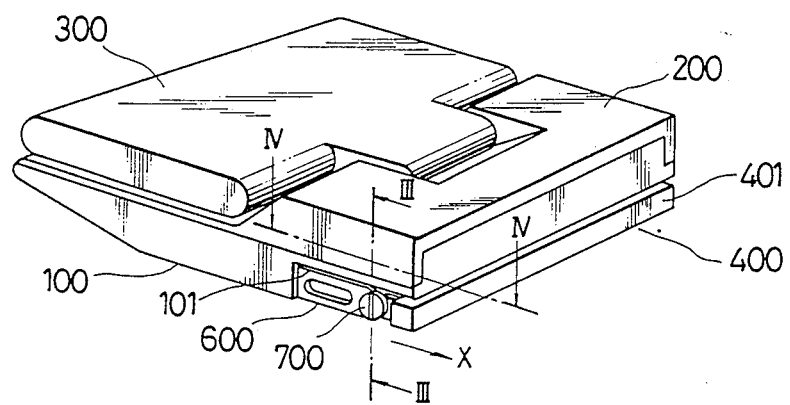
FIG. 2 is a perspective view showing a portable electronic apparatus with a handle-leg portion stored according to the present invention.

When the upper case 300 is folded, it is located in the same plane as the body cover 200 to form a flat box as shown in FIG. 2. As indicated by the imaginary line in FIG. 7, with the upper case 300 being in an upright state, an upper surface of a front portion of the body case 100 is open to expose the keyboard and the plasma display provided on the front surface of the upper case 100 is positioned in front of an operator using the apparatus.

Figure 5:
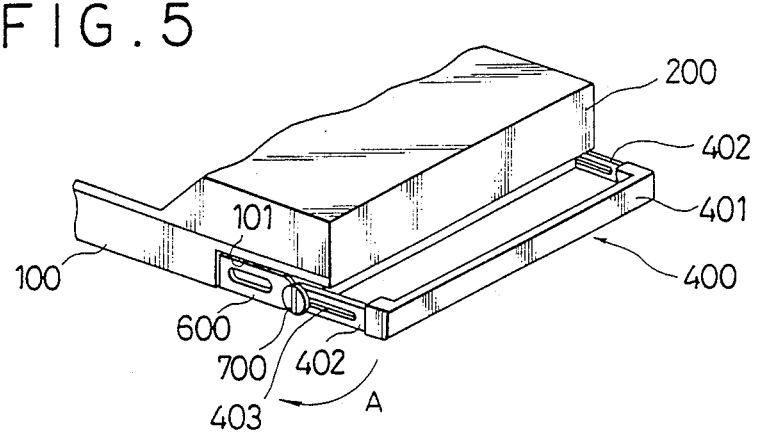
FIG. 5 is a perspective view showing a main portion of the handle-leg portion in a pulled-out state.
Figure 6:
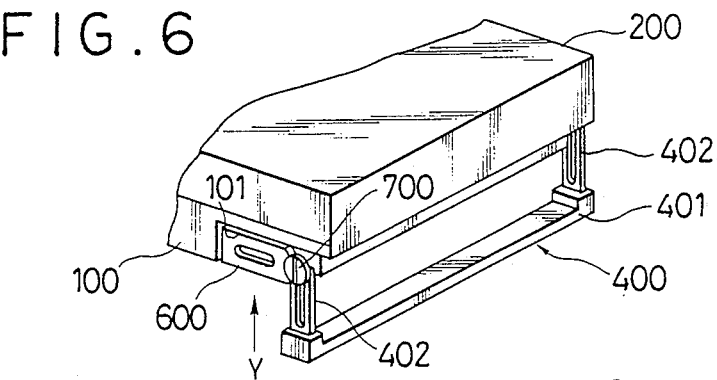
FIG. 6 is a perspective view showing the main portion of the handle-leg portion in an upright state.
Figure 7:
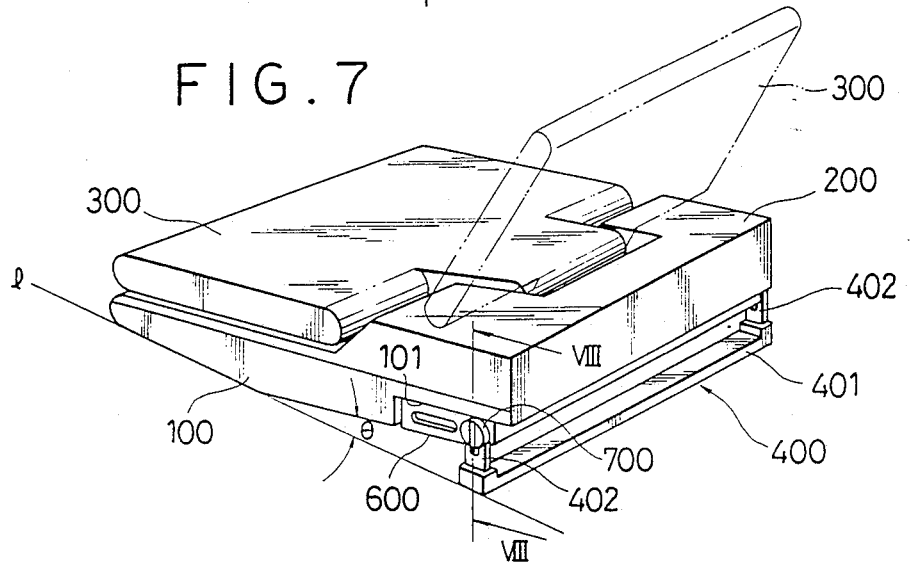
FIG. 7 is a perspective view showing the handle-leg portion in a complete upright state.

As shown in FIGS. 5, 6, and 7, a rear end wall of the body has a rear upper end wall 203 and a rear lower end wall 205.

In a rear portion of the body case 100, there is arranged a handle leg portion 400 which functions as a handle and a leg portion and can be stored and pulled out of the body case 100.

The handle-leg portion 400 comprises a handle piece 401 injection-molded from synthetic resin and is rested on a rear lower end wall 205 of the body case 100 such that the handle piece aligns with the rear upper end wall 203, and metallic leg pieces 402 formed integrally with both sides of the handle piece 401.

The leg pieces 402 slide along handle guide grooves 101 formed along both sides of the body case 100 in the rear portion thereof. A metallic handle support 600 is disposed outside each handle guide groove 101. Each leg piece 402 is inserted between the guide groove 101 and the handle support 600 (FIG. 3).

Figure 3:
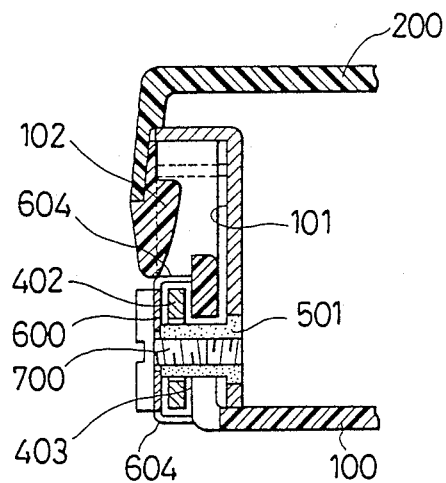
FIGS. 3 and 4 are cross-sectional views taken along lines III—III and V—IV respectively shown in FIG. 2.
Figure 4:
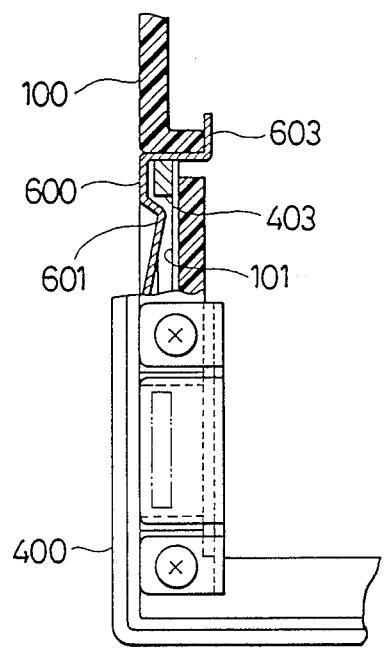
Figure 8:
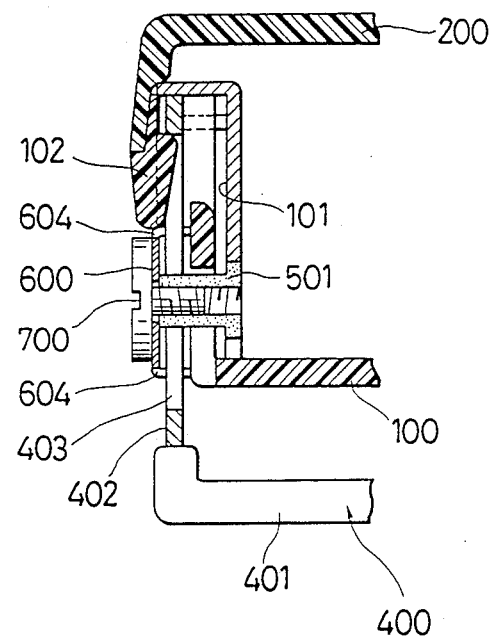
FIG. 8 is a cross-sectional view taken along line VIII—VIII shown in FIG. 7.

As shown in FIGS. 3, 4, and 8, each handle support 600 has a channel shaped section to surround the leg piece 402 together with the guiding groove 101. An L-shaped bent portion 603 formed at one front end of each handle support 600 is engaged with a fitting hole 102 opening at one end of each guide groove 101. Another rear end of each handle support 600 is fixed to the side of the body case 100 with a fastening screw 700.

The fastening screw 700 is screwed and fixed to a boss portion 501 projecting on each side of the rear portion of the body case 100. The boss portion 501 is engaged with a guide hole 403 having an elongated hole shape and formed in each leg piece 402 to pass therethrough. The boss portion 501 acts as a guide pin to support the leg piece 402 slidably and pivotably.

As shown in FIG. 4, a locking piece 601 is formed on the inner surface of each handle support 600. The locking piece 601 slants from the rear portion to the front portion. When the leg pieces 402 are located at the most front position, i.e., when the leg portion 400 is in a stored state as shown in FIG. 2, the most front end of each locking piece 601 resiliently enters the front end of each guiding hole 403 as shown in FIG. 4, thereby locking the leg portion 400 in the stored state.

A notch 604 is formed at the rear end of each handle support 600 to restrict the pivotal movement of each leg piece 402. At the position of the notch 604, the guide groove 101 is formed to rise higher and is surrounded by a tapered locking piece 102 which is downwardly extended from a lower edge portion on each side of the body cover 200.

When the leg portion 400 is completely pulled out as shown in FIG. 5, each leg piece 402 pivots downwardly in a direction indicated by arrow "A" around the boss portion 501. The stopping position of the pivotal movement of the leg piece 402 is determined by a position in which the leg piece 402 contacts the notch 604 of the handle support 600.

In this state, when the leg portion 400 is pushed upwardly as shown in FIG. 6, the locking piece 102 resiliently enters the front end portion of the guide hole 403 of the leg piece 402 as shown in FIG. 8 so that the leg portion 400 is locked in an upright state.

The pulled-out operation of the leg portion 400 in the above arrangement will next be described.

At the stored position shown in FIG. 2, the handle piece 401 is on the same plane as the rear surface of the body case 100 to cover the body case so that connectors for external connection, etc., arranged on the rear surface of the body case 100 may be protected by the handle piece 401.

When the handle piece 401 is pulled out in a direction indicated by arrow "X" from the above-mentioned position, the locking pieces 601 are forcibly dislocated from the guide holes 403, pulling out the handle piece 401 to the maximum pulled-out position as shown in FIG. 5.

In this state, the handle piece 401 is grasped to carry the apparatus.

When the apparatus is put on a desk, etc., and the keyboard is inclined on this side, the leg portion 400 is inclined toward the bottom of the body case 100 and pushed upwardly in a direction indicated by arrow "Y" as shown in FIG. 6. Then, the locking piece 102 resiliently enters the ends of the guide holes 403 of the leg pieces 402 so that the leg portion 400 is locked in the upright state.

In this state, as shown in FIG. 7, the body case 100 is set to be slanted forwardly by a predetermined angle $\theta$ with respect to a horizontal line 1 on the desk.

The operations of the apparatus from the upright position to the stored position are opposite to the above-mentioned operations. A locked state can be easily confirmed by a click sound generated when the locking pieces 601 and 102 engage with the guide holes 403.

Figure 9:
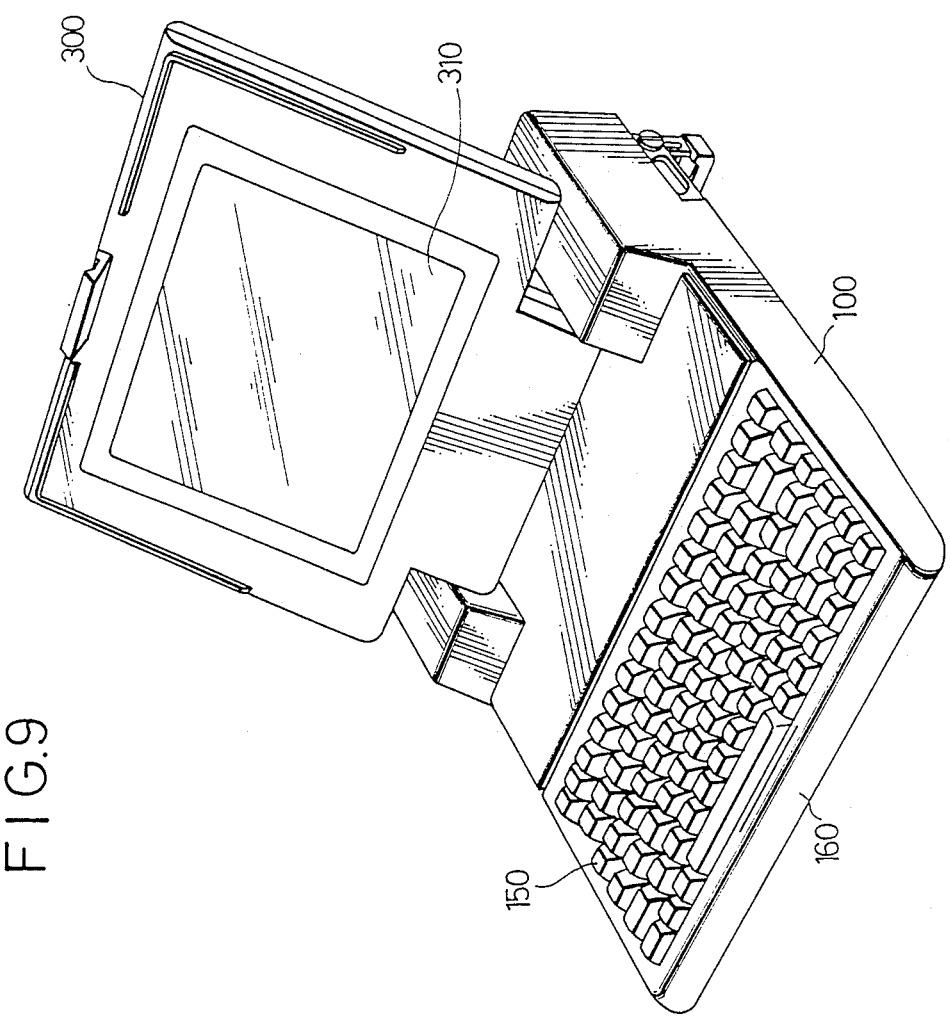
FIG. 9 is a perspective view showing a keyboard and a display of the portable electronic apparatus shown in FIG. 2.

As shown in FIG. 9, the body case 100 has a keyboard 150 on its front top surface and a front end portion 160. The upper case 300 has a plasma display 310. When the plasma display 310 is closed on the body case 100, the keyboard 150 is covered by the upper case 300.

As described in the above embodiment, according to the portable apparatus of the present invention, the handle acts as a leg portion as well so that the storing, pull-out, and upright operations are easily and sequentially performed, and the mechanism of the apparatus is simplified. Since the handle-leg portion is stored on the back side of the case, the case can be designed with substantially no increase in volume of the case with respect to the internal mechanism thereof so that the case becomes compact. Further, the handle-leg portion can be reliably locked in the stored and the upright positions respectively so that the apparatus can stably be supported with no shaking in operation.

What is claimed is:

1. A portable apparatus, comprising:
    a body including a rear portion having a rear end wall and a rear upper surface having an upper case connecting part, and a front portion having a front end portion and a front upper surface;
    a keyboard located in the front upper surface of said front portion;
    an upper case having a display, pivotally connected to the body by the upper case connecting part, and covering the keyboard when the upper case is closed; and
    handle-leg means including a handle piece, movably connected to the rear portion and adjustable between first, second, and third positions, wherein said handle-leg means extends substantially vertically from a rear portion of said upper case for tilting the keyboard toward the front end portion in the first position, wherein said handle-leg means extends substantially longitudinally from said rear portion of said upper case for providing a handle for carrying the apparatus in the second position, and wherein said handle-leg means is substantially flush with said rear portion of said upper case in said third position.

2. The apparatus of claim 1, wherein the handle-leg means further comprises leg piece means fixed to the handle piece for slidably and pivotally connecting the handle-leg means to the rear portion.

3. The apparatus of claim 2, wherein the leg piece means is extended from the rear wall in the second position.

4. A portable apparatus, comprising:
    a body including a rear portion having a rear wall and a rear upper surface having an upper case connecting part, and a front portion having a front end portion and a front upper surface;
    a keyboard located in the front upper surface of said front portion;

an upper case having a display, pivotally connected to the body by the upper case connecting part, and covering the keyboard when the upper case is closed;

handle-leg means, including a handle piece movably connected to the rear portion and adjustable to at least first, second, and third positions, for tilting the keyboard toward the front end portion in the first position, for providing a handle for carrying the apparatus in the second position, and for adjusting the handle piece against the rear portion in the third position, said handle-leg means further including leg piece means, fixed to the handle piece and extending from the rear end wall in the second position, for slidably and pivotally connecting the handle-leg means to the rear portion;

wherein the rear end wall further comprises an upper end wall section and a lower end wall section, and wherein the handle piece further comprises an outer surface facing away from the apparatus, and wherein the handle piece is adjusted against the lower end wall section in the third position such that the outer surface of said handle piece and the upper end wall section are coplanar.

5. The apparatus of claim 4, further comprising means for pivotally supporting the handle-leg means when the handle-leg means is moved between the first and the second positions.

6. The apparatus of claim 5, further comprising guide means for slidably guiding the handle-leg means when the handle-leg means is moved between the second and the third positions.

7. The apparatus of claim 6, further comprising a first locking means for locking the handle-leg means in the first position, and a second locking means for locking the handle-leg means in the third position.

8. The apparatus of claim 7, wherein the rear portion further comprises a slide wall having a guide groove, and wherein the guide means and the pivotally supporting means are located at the guide groove, and wherein the first and the second locking means are located on the side wall.

9. A portable apparatus, comprising:

a body including a rear portion having a rear end wall, a pair of side walls, and a rear upper surface, and a front portion having a front end portion and a front upper surface, the rear upper surface having an upper case connecting part, each side wall having a handle support and a screw, the front upper surface having a keyboard in front of the rear portion;

an upper case having a display, pivotally connected to the body by the upper case connecting part, and covering the keyboard when the upper case is closed; and handle-leg means including a handle piece and pair of leg pieces, one end of each leg piece being slidably connected to the handle support and slidably and pivotally connected to a respective one of said screws of each said sidewall, the other end of each leg piece being fixed to the handle piece, the handle-leg means being movably connected to the rear portion and adjustable to a first, a second, and a third position, for respectively tilting the keyboard toward the front end portion in the first position, providing a handle for carrying the apparatus in the second position, and adjusting the handle piece against the rear end wall in the third position.

10. The apparatus of claim 9 wherein the leg pieces are extended from the rear end wall in the second position.

11. The apparatus of claim 10 wherein the rear end wall further comprises an upper end wall section and a lower end wall section, and wherein the handle piece further comprises an outer surface facing away from the apparatus, and wherein the handle piece is adjusted against the lower end wall section in the third position such that the outer surface and the upper end wall section are coplanar.

12. The apparatus of claim 11 further comprising a first locking means for locking the handle-leg means in the first position and a second locking means for locking the handle-leg means in the third position.

13. The apparatus of claim 12, wherein the side walls further include a guide groove, and wherein the handle support and the screw are located at the guide groove.

* * * * *